(12) United States Patent
Isozaki

(10) Patent No.: US 6,337,369 B1
(45) Date of Patent: Jan. 8, 2002

(54) POLARIZING FILM

(75) Inventor: Takanori Isozaki, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/147,181

(22) PCT Filed: Mar. 17, 1998

(86) PCT No.: PCT/JP98/01119

§ 371 Date: Oct. 26, 1998

§ 102(e) Date: Oct. 26, 1998

(87) PCT Pub. No.: WO98/41887

PCT Pub. Date: Sep. 24, 1998

(30) Foreign Application Priority Data

Mar. 19, 1997 (JP) ............................................. 9-065842

(51) Int. Cl.$^7$ ................................................. C08F 8/00
(52) U.S. Cl. ........................ 525/61; 252/585; 264/1.31; 264/1.34; 264/1.35; 359/490; 524/557; 525/57
(58) Field of Search ........................ 252/585; 264/1.34, 264/1.35, 1.31; 359/490; 525/56, 61; 524/557

(56) References Cited

U.S. PATENT DOCUMENTS

| | | | | | |
|---|---|---|---|---|---|
| 2,173,304 A | * | 9/1939 | Land et al. | ..................... | 88/65 |
| 2,445,555 A | * | 7/1948 | Binda | ............................. | 88/65 |
| 3,914,017 A | * | 10/1975 | Bedell et al. | ................ | 350/281 |
| 3,979,339 A | * | 9/1976 | Claybaugh | .................. | 252/524 |
| 4,166,871 A | * | 9/1979 | Schuller | ..................... | 427/163 |
| 4,674,840 A | * | 6/1987 | Bennett | ...................... | 350/337 |
| 4,769,422 A | * | 9/1988 | Starzewski et al. | ......... | 525/245 |
| 4,818,624 A | * | 4/1989 | Downey, Jr. | ................ | 428/447 |
| 4,893,911 A | * | 1/1990 | Ostaja-Starzewski et al. | .... | 350/398 |
| 4,895,769 A | | 1/1990 | Land et al. | | |
| 5,051,286 A | | 9/1991 | Starzewski | | |
| 5,071,906 A | | 12/1991 | Tanaka et al. | | |
| 5,093,401 A | * | 3/1992 | Claussen et al. | ............. | 524/379 |
| 5,434,707 A | * | 7/1995 | Dalzell et al. | .............. | 359/485 |

FOREIGN PATENT DOCUMENTS

| | | | |
|---|---|---|---|
| EP | 297927 | * | 1/1989 |
| JP | 48601 | * | 1/1989 |

OTHER PUBLICATIONS

Patent Abstracts of Japan, vol. 013, No. 314 (P–899), Jul. 18, 1989, JP 01 084203, Mar. 29, 1989.

* cited by examiner

Primary Examiner—Judy M. Reddick
(74) Attorney, Agent, or Firm—Oblon, Spivak, McClelland, Maier & Neustadt, P.C.

(57) ABSTRACT

The present invention provides a polarizing film having a dichroic ratio of at least 20 and comprising a polyvinyl alcohol derivative with a polyvinylene structure as obtained from a polyvinyl alcohol material having a degree of polymerization of at least 2000.

The polarizing film of the present invention has excellent polarizing properties in the range of the visible ray spectrum, and exhibits excellent durability when left in high-temperature and high-humidity surroundings for a long period of time. The polarizing film of the present invention is useful for a polarizing sheet laminated with a protective film for on-vehicle LCD that is placed in heavy temperature and humidity fluctuations, such as LCD navigation systems, LCD TV, etc.

17 Claims, No Drawings

POLARIZING FILM

BACKGROUND OF THE INVENTION

1. Field of the Invention

The present invention relates to a polarizing film comprising a polyvinyl alcohol derivative with a polyvinylene structure.

2. Description of the Background

A Polarizing sheet having a light-transmitting and shielding function laminated with protective films is a basic constituent element for a liquid crystal display (LCD), along with a liquid crystal having a light-switching function. The applications of the LCD include small-sized instruments such as pocket calculators, watches, etc. in the early years, as well as lap-top personal computers, word processors, liquid-crystal color projectors, on-vehicle navigation systems, liquid-crystal TV, indoor and outdoor measuring instruments, etc. The LCD has been used in heavy temperature and humidity fluctuations of from low temperature to high temperature and from low humidity to high humidity. Accordingly, there has been desired a polarizing sheet which has excellent durability such as wet heat resistance, etc. and excellent polarizing properties.

A polarizing sheet has a structure that both sides of a polarizing film as obtained from a polyvinyl alcohol (hereinafter referred to as PVA) film are laminated with supporting films of cellulose triacetate or the like. As a polarizing film, there have been known an iodine-containing polarizing film as prepared by dyeing a PVA film with iodine, a dye-containing polarizing film as prepared by dyeing a PVA film with a dichroic dye, and a polarizing film of a PVA derivative with a polyvinylene structure as prepared by dehydrating a PVA film (U.S. Pat. No. 2,173,304).

The iodine-containing polarizing film and the dye-containing polarizing film have good polarizing properties, while they have a problem that their durability is poor. The polarizing film of a polyvinyl alcohol derivative with a polyvinylene structure has excellent durability, while it has a problem that its polarizing property is poor.

SUMMARY OF THE INVENTION

The object of the present invention is to provide a polarizing film which has excellent durability and excellent polarizing properties.

Having intensively studied to solve the above object, the present inventor has found out a polarizing film having a dichroic ratio of at least 20 and comprising a polyvinyl alcohol derivative with a polyvinylene structure as obtained from a polyvinyl alcohol material having a degree of polymerization of at least 2000, and has completed the present invention.

DESCRIPTION OF THE PREFERRED EMBODIMENTS

The present invention is described in more detail hereinunder.

The degree of polymerization of the PVA material to be used for producing the polarizing film of the present invention is at least 2000, but preferably at least 2800, more preferably at least 3000, even more preferably at least 3500. The higher the degree of polymerization, the better the durability and the polarizing properties. In view of the film-forming properties, the upper limit of the degree of polymerization is preferably 30000. The degree of polymerization of the PVA is measured according to JIS-K-6726.

In view of the polarizing properties and the durability, the degree of hydrolysis of the PVA is preferably at least 90 mol %, more preferably at least 98 mol %, even more preferably at least 99 mol %, still more preferably at least 99.5 mol %.

The dichroic ratio of the polarizing film is at least 20, preferably at least 25, more preferably at least 30. To increase its dichroic ratio, it is desirable that a PVA film having a high degree of polymerization and containing a dehydrating promoter is stretched under dry-heat at a high stretch ratio in an oxygen-poor atmosphere.

The wavelength of maximal absorption in the range of the visible ray absorption spectrum (wavelength: 380 to 780 nm) of the polarizing film is preferably at least 500 nm, more preferably at least 520 nm, even more preferably at least 540 nm. The upper limit of the wavelength of maximal absorption is preferably 650 nm, more preferably 620 nm. As the degree of polymerization of the PVA to be used as a material becomes higher, the wavelength of maximal absorption tends to shift to a higher wavelength side.

In the case where the wavelength of maximal absorption is in the above-described range, it is estimated that the number of vinylene units of conjugated double bonds which constitute the polyvinylene structure be approximately from 15 to 30.

As a method for producing PVA, for example, there are a method of hydrolyzing a polyvinyl ester polymer as obtained through radical polymerization of a vinyl ester monomer such as vinyl acetate and the like, with an alkali catalyst or an acid catalyst.

As a method for polymerizing a vinyl ester monomer, for example, there are bulk polymerization, solution polymerization, suspension polymerization, emulsion polymerization and the like. Bulk polymerization or emulsion polymerization is preferable to obtain PVA having a degree of polymerization of at least 4000. As a polymerization catalyst, for example, there are azo catalyst, peroxide catalyst, redox catalyst, etc.

As a vinyl ester monomer, for example, there are vinyl formate, vinyl acetate, vinyl propionate, vinyl valerate, vinyl caprate, vinyl laurate, vinyl stearate, vinyl benzoate, vinyl pivalate, vinyl trifluoroacetate, vinyl versatate, etc. Of those, vinyl acetate is preferable.

The vinyl ester monomer may be copolymerized with a copolymerizable comonomer.

As a comonomer, for example, thare are olefins such as ethylene, propylene, 1-butene, isobutene, etc.; acrylic acid and its salts; acrylates such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, octadecyl acrylate, etc.; methacrylic acid and its salts; methacrylates such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, octadecyl methacrylate, etc.; acrylamide derivatives such as acrylamide, N-methylacrylamide, N-ethylacrylamide, N,N-dimethylacrylamide, diacetonacrylamide, acrylamidopropanesulfonic acid and its salts, acrylamidopropyldimethylamine and its salts and quaternary salts, N-methylolacrylamide and its derivatives, etc.; methacrylamide derivatives such as methacrylamide, N-methylmethacrylamide, N-ethylmethacrylamide, methacrylamidopropanesulfonic acid and its salts, methacrylamidopropyldimethylamine and its salts and quaternary salt, N-methylolmethacrylamide and its derivatives, etc.; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, etc.; nitrites such as acrylonitrile, methacrylonitrile, etc.; vinyl halides such as vinyl chloride, vinylidene chloride, vinyl fluoride, vinylidene fluoride, etc.; allyl compounds such as allyl acetate, allyl chloride, etc.; maleic acid and its salts and esters; vinylsilyl compounds such as vinyltrimethoxysilane, etc.; isopropenyl acetate, etc.

As another method for producing PVA, there may be a method of hydrolyzing a polyvinyl ether polymer from t-butyl vinyl ether, benzyl vinyl ether, trimethylsilyl vinyl ether and the like.

A PVA film as prepared by film-forming a PVA having a degree of polymerization of at least 2000 is used for producing the polarizing film of the present invention. As a method of film-forming a PVA film, for example, there is a casting method or a die-casting method that comprises casting a PVA solution onto a resin film, a drying drum or a drying belt. As a solvent for the PVA, for example, there are water, an organic solvent, and a mixed solvent of water and an organic solvent. The organic solvent includes dimethylsulfoxide, phenol, methanol, ethanol, etc. The PVA solution may optionally contain any of plasticizers, surfactants, dichroic dyes, inorganic salts, etc. The PVA film may be heat-treated, if desired. The thickness of the PVA film is preferably 5 to 500 $\mu$m, more preferably 30 to 200 $\mu$m.

The process for producing the polarizing film comprises a treatment of pre-swelling a PVA film, a treatment of dehydrating so as to form a polyvinylene structure in the PVA film, a treatment of monoaxially stretching (in many cases, the monoaxial stretching and the dehydration are often conducted at the same time), a treatment of fixing with a boron compound or the like, and a treatment of drying. If desired, a heat treatment may be conducted. There is no limitation on the order and the number of each treatment.

As the treatment of dehydrating so as to form a polyvinylene structure in the PVA film, for example, there are a method of stretching a PVA film that contains a dehydrating promoter, and a method of heating a stretched PVA film with a dehydrating promoter. As a method of adding a dehydrating promoter into the PVA film, there are a method of dipping the PVA film in an aqueous solution containing a dehydrating promoter, a method of placing the PVA film in an atmosphere of a gaseous dehydrating promoter, and a method of film-forming the PVA solution containing a dehydrating promoter. As a dehydrating promoter, there are protonic acids such as hydrochloric acid, sulfuric acid, etc.; and stannous halides such as stannous chloride, stannous bromide, etc. The amount of the dehydrating promoter is preferably 0.001 to 10% by weight based on the PVA. In the case where the amount of the dehydrating promoter is less than the above-described range, the polarizing performance hardly appears. On the other hand, in the case where it is more than the above-described range, the efficient dehydration becomes difficult. The dehydrating promoter may be added to the PVA film during the film-forming step, before the monoaxial stretching step, or before the dehydrating step. When the dehydrating promoter is added to the film-forming stock solution for the PVA film, the care should be paid because too high drying temperature during the film-forming causes the possibility of the thermal oxdation of PVA.

As a method of monoaxial stretching, for example, there are dry-heat stretching, wet stretching, stretching in warm water, stretching in air with the conditions of water absorption.

The stretching temperature for dry-heat stretching is preferably at least 100° C., more preferably at least 120° C., even more preferably at least 140° C. The upper limit of the stretching temperature is preferably 250° C., more preferably 230° C., even more preferably 220° C. If desired, the stretching temperature may be changed, depending on the stretched film condition during stretching. The dry-heat stretching is preferably conducted in an oxygen-poor atmosphere such as a nitrogen atmosphere or in vacuum, because there is a possibility of discoloration due to the oxidation of PVA. The PVA film is converted into a colored film having polarizing properties during the dry-heat stretching.

The stretching temperature for wet stretching is preferably at least 20° C., more preferably at least 40° C., even more preferably at least 50° C. The upper limit of the stretching temperature is preferably 90° C., more preferably 80° C. A heat treatment is required because intended polyvinylene structure could not be formed according to only wet stretching.

In the case where the stretching temperature is too low, the stretching with a high stretching ratio becomes difficult, resulting in that the polarizing properties could hardly be improved. On the other hand, in the case where the stretching temperature is too high, the film tends to be cut off during stretching. When the stretching is intermittently conducted two times or more, different stretching methods may be employed.

The stretching ratio is preferably at least 4-fold, more preferably at least 5-fold. With the increase in the stretching ratio, the wavelength of maximal absorption shifts to a higher wavelength side, and the optical performance is improved. The upper limit of the stretching ratio is preferably 10-fold, more preferably 9-fold, in view of the possibility of uniform stretching.

In the case where the dehydration (the formation of polyvinylene structure) by stretching is not enough, a dehydrating promoter is further added, and the film is heated to be dehydrated. The temperature for the dehydration is preferably 90 to 180° C., more preferably 130 to 170° C.

The amount of water to be removed from PVA is preferably 1 to 5% by weight based on the PVA film, where the film has a thickness of 30 to 100 $\mu$m. In the case where the amount of removed water from PVA is too small, the absorption in visible ray decreases, and enough polarizing performance does not appear. On the other hand, in the case where the amount of removed water is too much, the absorption in visible ray increases too much, causing the difficulty in obtaining a polarizing film with a suitable transparency, and furthermore intermolecular crosslinking occurs, reducing the number of conjugated double bonds or making the film brittle.

In the case where the dehydrating promoter remains in the polarizing film, there is a possibility that the polarizing properties change while left at a high temperature. Therefore, it is desirable to remove the dehydrating promoter by dipping in water, weak-alkaline aqueous solution, water-containing methanol, or aqueous solution of an inorganic substance such as saline or the like.

After the formation of a polyvinylene structure in PVA film, it is preferably dipped in a bath for fixing treatment containing 1 to 6% by weight of a boron compound (e.g., boric acid). The fixing treatment may be conducted according to the required waterproof level. The temperature in the bath for fixing treatment is preferably 20 to 70° C. The drying temperature after taking out of the fixing bath is preferably 30 to 80° C. A heat treatment may be conducted at 50 to 150° C. after drying.

The thickness of the polarizing film of the present invention is preferably 5 to 200 μm, more preferably 10 to 100 μm.

In order to obtain the furthermore enough resistance to water, the polarizing film of the present invention may be laminated, either on its both sides or on its one side, with a protective film which is transparent and has a mechanical strength, thereby giving a polarizing sheet. As a protective film, there are used cellulose acetate film, acrylic film, polyester film, etc.

The present invention is described concretely hereinunder with the following Examples, which, however, are not intended to restrict the scope of the present invention. Unless otherwise specifically indicated, "%" and "part" in Examples are "% by weight" and "part by weight".

The polyvinylene structure in a polarizing film was identified by measuring the wavelength of maximal absorption in the range of the visible ray absorption spectrum (wavelength: 380 to 780 nm) through UV and visible ray spectrophotometer.

The transmittance, the degree of polarization and the dichroic ratio of a polarizing film were measured and calculated according to the Standard of the Electronic Industry Association of Japan (EIAJ) LD-201-1983, using a spectrophotometer with a C light source in the standard colorimetric system.

A Polarizing film is generally used as being laminated with a protective film, however in the following Examples a polarizing film alone without a protective film was tested to measure its properties.

EXAMPLE 1

A film of PVA (degree of polymerization 4000, degree of hydrolysis 99.9 mol %) having a thickness of 100 μm was dipped in an aqueous solution of sulfuric acid (0.01 N) at 20° C. for 10 minutes. This was dried at 20° C. for 30 minutes. This was stretched 6.8-fold in the monoaxial direction, in nitrogen at 190° C. Next, this was dipped in an aqueous solution of 4 % boric acid for 10 minutes, whereby sulfuric acid was removed and, at the same time, the stretched film was fixed. Finally, this was dried in blowing warm air at 40° C. Thus was obtained a polarizing film having a polyvinylene structure therein and having a thickness of 20 μm. The results of evaluation on the polarizing film are shown in Table 1.

EXAMPLE 2

A film of PVA (degree of polymerization 9000, degree of hydrolysis 99.6 mol %) having a thickness of 75 μm was dipped in an aqueous solution of sulfuric acid (0.01 N) at 20° C. for 10 minutes. This was dried at 20° C. for 30 minutes. This was stretched 6.5-fold in the monoaxial direction, in nitrogen at 220° C. Next, this was rinsed by distilled water. Finally, this was dried in blowing warm air at 40° C. Thus was obtained a polarizing film having a polyvinylene structure therein and having a thickness of 18 μm. The results of evaluation on the polarizing film are shown in Table 1.

EXAMPLE 3

A film of PVA (degree of polymerization 2600, degree of hydrolysis 99.7 mol %) having a thickness of 75 μm was dipped in an aqueous solution of sulfuric acid (0.1 N) at 20° C. for 10 minutes. This was dried at 20° C. for 30 minutes. This was stretched 5.2-fold in the monoaxial direction, in nitrogen at 160° C. Next, this was rinsed by distilled water. Finally, this was dried in blowing warm air at 40° C. Thus was obtained a polarizing film having a polyvinylene structure therein and having a thickness of 24 μm. The results of evaluation on the polarizing film are shown in Table 1.

COMPARATIVE EXAMPLE 1

A film of PVA (degree of polymerization 1700, degree of hydrolysis 99.9 mol %) having a thickness of 100 μm was dipped in an aqueous solution of sulfuric acid (0.5 N) at 20° C. for 10 minutes. This was dried at 20° C. for 30 minutes. This was stretched 4.3-fold in the monoaxial direction, in air at 130° C. Next, this was rinsed by distilled water. Finally, this was dried in blowing warm air at 40° C. Thus was obtained a polarizing film having a polyvinylene structure therein and having a thickness of 51 μm. The results of evaluation on the polarizing film are shown in Table 1.

COMPARATIVE EXAMPLE 2

A film of PVA (degree of polymerization 4000, degree of hydrolysis 99.7 mol %) having a thickness of 75 μm was dipped in an aqueous dyeing solution (iodine 0.2 g/liter, potassium iodide 20 g/liter, boric acid 40 g/liter) at 30° C. for 3 minutes. Next, this was stretched 4-fold in the monoaxial direction, in an aqueous solution of boric acid (40 g/liter) at 50° C., and then dipped in an aqueous processing solution (potassium iodide 20 g/liter, boric acid 40 g/liter, zinc chloride 10 g/liter) at 30° C. for 4 minutes. Finally, this was dried in blowing warm air at 40° C. Thus was obtained an iodine-containing polarizing film (with no polyvinylene structure) having a thickness of 16 μm. The results of evaluation on the polarizing film are shown in Table 1.

TABLE 1

| | Optical Properties before shelf test | | | | Optical Properties after shelf test (shelf test Condition: 80° C., 90% RH, 1000 hours) | | |
|---|---|---|---|---|---|---|---|
| | Transmittance (%) | Degree of Polarization (%) | Dichroic Ratio | Wavelength of Maximal Absorption (nm) | Transmittance (%) | Degree of Polarization (%) | Dichroic Ratio |
| Example 1 | 42.9 | 98.8 | 33 | 580 | 43.7 | 95.1 | 24 |
| Example 2 | 42.5 | 99.2 | 34 | 590 | 43.0 | 97.0 | 26 |
| Example 3 | 36.4 | 99.6 | 20 | 560 | 37.8 | 96.0 | 14 |
| Comparative | 40.0 | 77.2 | 7 | 490 | 42.9 | 58.1 | 4 |

TABLE 1-continued

| | Optical Properties before shelf test | | | | Optical Properties after shelf test (shelf test Condition: 80° C., 90% RH, 1000 hours) | | |
|---|---|---|---|---|---|---|---|
| | Transmittance (%) | Degree of Polarization (%) | Dichroic Ratio | Wavelength of Maximal Absorption (nm) | Transmittance (%) | Degree of Polarization (%) | Dichroic Ratio |
| Example 1 Comparative Example 2 | 43.4 | 99.1 | 38 | — | 90.7 | 0.0 | 1 |

INDUSTRIAL APPLICABILITY

The polarizing film of the present invention has excellent polarizing properties in the range of the visible ray spectrum, and exhibits excellent durability when left in high-temperature and high-humidity surroundings for a long period of time. The polarizing film of the present invention is useful for a polarizing sheet laminated with a protective film for on-vehicle LCD that is placed in heavy temperature and humidity fluctuations, such as LCD navigation systems, LCD TV, etc.

What is claimed is:

1. A polarizing film having a dichroic ratio of at least 20 before a shelf test under conditions of a temperature of 80° C., a relative humidity of 90% and a period of 1000 hours and a dichroic ratio of at least 14 after said shelf test comprising: polyvinyl alcohol having a polyvinylene structure obtained from a polyvinyl alcohol having a degree of polymerization of at least 2600.

2. The polarizing film as claimed in claim 1, which has a wavelength of maximal absorption of at least 500 nm in the range of the visible ray absorption spectrum.

3. The polarizing film as claimed in claim 1 or 2, wherein said polyvinyl alcohol has a degree of hydrolysis of at least 90 mol %.

4. The polarizing film as claimed in claim 1, wherein said polyvinyl alcohol has a degree of polymerization of at least 2800.

5. The polarizing film as claimed in claim 4, wherein said polyvinyl alcohol has a degree of hydrolysis of at least 90 mol. %.

6. The polarizing film as claimed in claim 1, wherein said polyvinyl alcohol has a degree of hydrolysis of at least 98 mol. %.

7. The polarizing film as claimed in claim 1, wherein the dichroic ratio of said film is at least 25.

8. The polarizing film as claimed in claim 1, wherein said polyvinylene structure has a maximum wavelength absorption in the range of 380 to 780 nm.

9. The polarizing film as claimed in claim 1, wherein said polyvinyl alcohol has a degree of polymerization not greater than 30,000.

10. The polarizing film as claimed in claim 2, wherein said polyvinyl alcohol has a degree of polymerization not greater than 30,000.

11. The polarizing film as claimed in claim 3, wherein said polyvinyl alcohol has a degree of polymerization not greater than 30,000.

12. The polarizing film as claimed in claim 4, wherein said polyvinyl alcohol has a degree of polymerization not greater than 30,000.

13. The polarizing film as claimed in claim 5, wherein said polyvinyl alcohol has a degree of polymerization not greater than 30,000.

14. The polarizing film as claimed in claim 6, wherein said polyvinyl alcohol has a degree of polymerization not greater than 30,000.

15. The polarizing film as claimed in claim 7, wherein said polyvinyl alcohol has a degree of polymerization not greater than 30,000.

16. The polarizing film as claimed in claim 8, wherein said polyvinyl alcohol has a degree of polymerization not greater than 30,000.

17. The polarizing film as claimed in claim 1, wherein said polyvinyl alcohol has a degree of polymerization of from 2600–9000.

* * * * *